(No Model.) 2 Sheets—Sheet 1.
W. A. BOLE.
ENGINE, PUMP, OR COMPRESSOR.
No. 592,688. Patented Oct. 26, 1897.

WITNESSES:
Chas. F. Miller
F. E. Gaither

INVENTOR.
William A. Bole,
by Thomas J. Hogan,
Att'y.

(No Model.) 2 Sheets—Sheet 2.

W. A. BOLE.
ENGINE, PUMP, OR COMPRESSOR.

No. 592,688. Patented Oct. 26, 1897.

WITNESSES:
Chas. F. Miller.
F. E. Gaither

INVENTOR.
William A. Bole,
by Thomas J. Hogan,
Att'y.

UNITED STATES PATENT OFFICE.

WILLIAM A. BOLE, OF PITTSBURG, PENNSYLVANIA.

ENGINE, PUMP, OR COMPRESSOR.

SPECIFICATION forming part of Letters Patent No. 592,688, dated October 26, 1897.

Application filed March 15, 1897. Serial No. 627,570. (No model.)

*To all whom it may concern:*

Be it known that I, WILLIAM A. BOLE, a citizen of the United States, residing at Pittsburg, in the county of Allegheny and State of Pennsylvania, have invented or discovered a certain new and useful Improvement in Engines, Pumps, or Compressors, of which improvement the following is a specification.

The object of my invention is to provide an improvement in engines of the class in which the connecting-rod is directly connected to a piston fitted to work in a cylinder; and to this end my invention consists of means whereby the connection between the connecting-rod and the piston is rendered accessible for examination, adjustment, removal, or renewal without removing the piston from the cylinder and whereby the examination or adjustment may be effected without disconnecting the rod from the crank.

My invention further consists in certain combinations and features of construction, all as hereinafter set forth.

Figure 1:
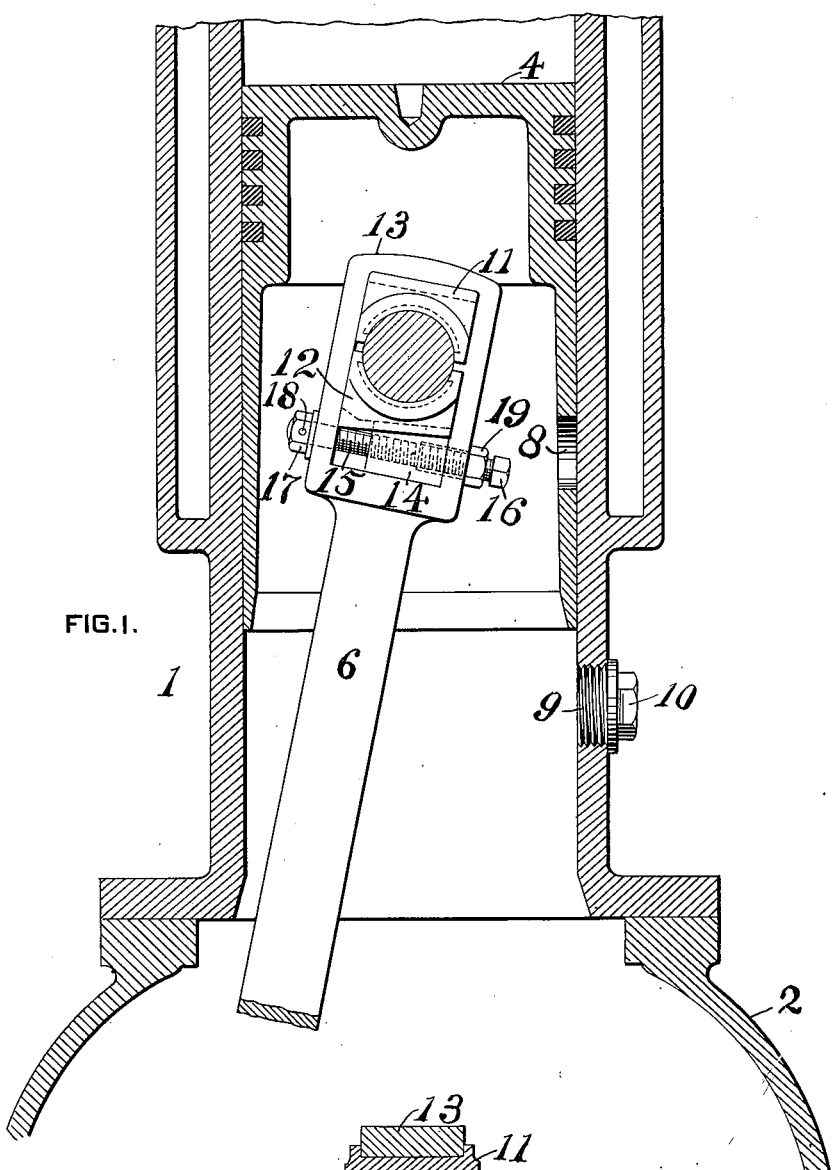
Figure 3:
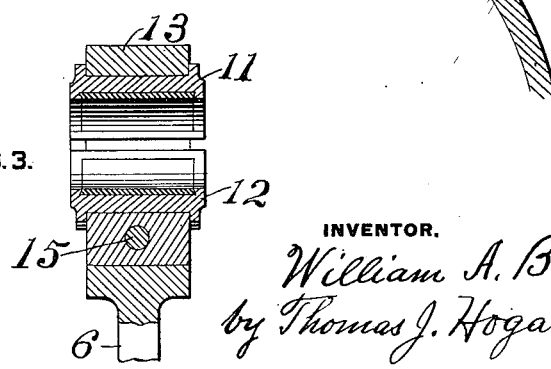
Figure 2:
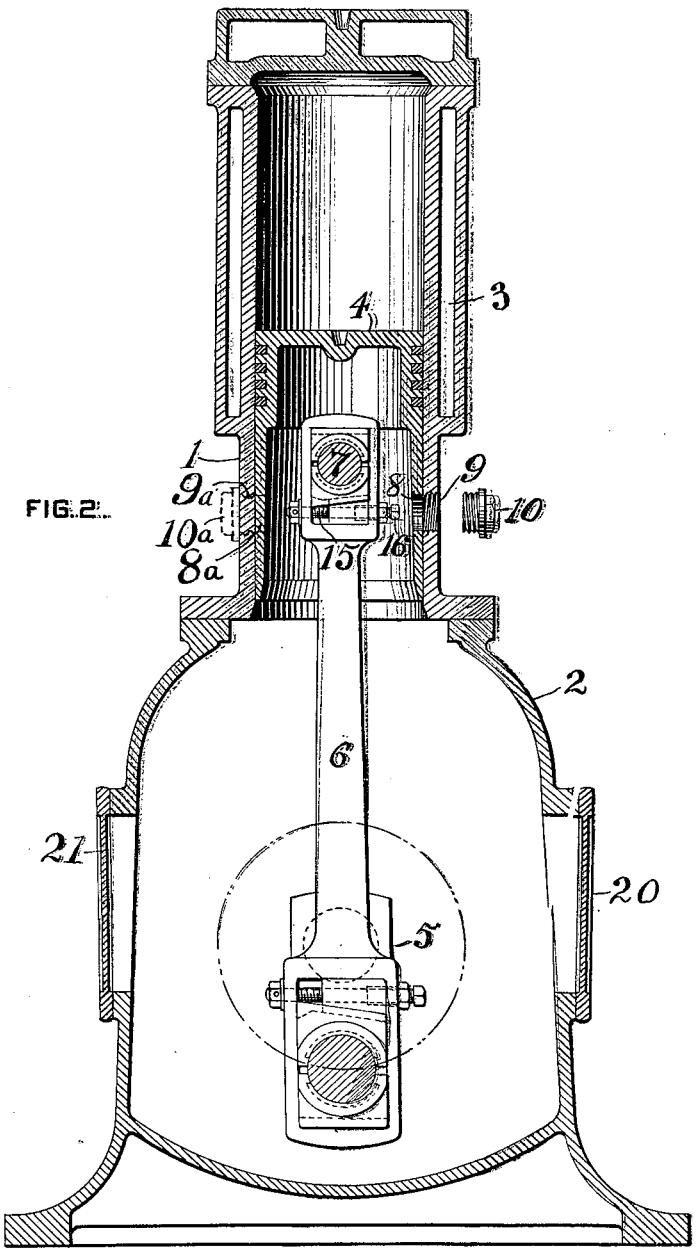

In the accompanying drawings, which illustrate an application of my invention, Figure 1 is a central section through the cylinder and piston of a gas-engine provided with my improvement; Fig. 2, a central vertical section through the piston, cylinder, and crank-case of a gas-engine provided with my improvement, the piston and connecting-rod being shown in a different position from that of Fig. 1; Fig. 3, a central section through the connecting-rod bearing.

My improvement is adapted to be employed in connection with any trunk-piston or single-acting piston working in a cylinder of a motor, pump, or compressor, and in the drawings is shown applied to a gas-engine in which the cylinder 1 is mounted on a closed crank-case 2 and is provided with a water-jacket 3. The trunk-piston 4 is fitted to slide in the cylinder 1 and is connected with the crank 5 by means of a connecting-rod 6 and the pin 7. The pin 7 is fitted with an adjustable bearing formed in the end of the connecting-rod 6.

My improvement is not limited to a construction employing any particular form of bearing between the connecting-rod and the piston, as any form of adjustable bearing may be employed. The essential feature of my invention is the means by which the bearing is rendered accessible, so that it may be adjusted from the outside of the cylinder without opening the crank-case or disconnecting any of the parts; and for this purpose I provide an opening 9 in the cylinder 1, and with a construction such as that shown in the drawings I provide the piston 4 with an opening 8, these openings being preferably so located as to be adapted to register when the piston is near the lower end of its stroke. The opening 9 in the cylinder 1 is provided with a screw-plug 10, by which it may be closed; but, if preferred, a bonnet or plate may be employed for closing the opening.

The adjustable bearing shown in the drawings consists of two brasses 11 and 12, fitted in the solid end 13 of the connecting-rod 6, the brass 12 being in contact with a sliding wedge 14, through which a screw-threaded bolt 15 passes. The bolt 15 engages with the screw-thread of the wedge 14 and is provided on the end next to the opening 8 of the piston with a polygonal head 16, which is adapted to be engaged by a wrench or other means for turning the bolt. The other end of the bolt is provided with a nut 17, secured in place by a removable pin 18, and a lock-nut 19 is employed to prevent the movement of the bolt when the engine is in operation.

As shown in Fig. 1, the piston is in the position which it will occupy when the crank is at half-stroke or thereabout, and the opening 8 in the piston does not then register with the opening 9 in the cylinder. In Fig. 2 the crank and piston are shown at one end of their stroke and the opening 8 registers with the opening 9 in the cylinder. The plug 10 is shown removed and the bolt 15 and its end 16 are in position to be adjusted from the outside of the cylinder.

By means of my improvement the adjustment of the bearing by which the connecting-rod is connected with the piston may be easily and quickly effected without removing either of the bonnets 20 or 21 or otherwise opening the crank-case 2 or disconnecting the cylinder 1 therefrom, or removing the piston or disconnecting the connecting-rod from the crank.

All that is necessary, if it is desired to adjust the bearing, is to remove the plug 10 and to turn the crank into such a position as to cause the opening 8 in the piston to register with the opening 9 in the cylinder. The end of the bolt 15 and the lock-nut 19 will then be in plain view and within easy reach from the outside of the cylinder and may be adjusted by the application of a wrench inserted through the openings 9 and 8. After the adjustment is effected the opening 9 may be again closed by the plug 10.

In Fig. 2 of the drawings I have shown in dotted lines an opening 8ª in the piston and an opening 9ª in the cylinder, which is shown closed by a screw-plug 10ª. Access to the nut 17 may be had through these openings in case it is desired to hold that nut in a fixed position while adjusting the bolt 15 or nut 19 or in case it is desired to remove the nut 17, or the openings 8ª and 9ª may be conveniently employed with some other construction of bearing or adjusting device and their positions relative to the openings 8 and 9 may vary, if found desirable.

I claim as my invention and desire to secure by Letters Patent—

1. The combination, with a cylinder mounted on a closed crank-case, of a piston in the cylinder, a connecting-rod having an adjustable connection with the piston, and a lateral opening in the cylinder, outside of the crank-case, whereby access to the connection is permitted without opening the crank-case, substantially as set forth.

2. The combination, with a cylinder mounted on a closed crank-case, of a piston in the cylinder, a connecting-rod having an adjustable connection with the piston, a lateral opening in the cylinder, outside of the crank-case, and an opening in the piston adapted to register with the opening in the cylinder and to permit direct access to the connection from the outside of the crank-case through the wall of the cylinder, substantially as set forth.

3. The combination, with a cylinder mounted on a closed crank-case, of a trunk-piston, a connecting-rod connected with the piston by an adjustable bearing, a lateral opening in the piston, and a normally-closed opening in the cylinder beyond the crank-case, with which the opening in the piston is adapted to register, whereby access to the connection may be permitted while the crank-case is closed, substantially as set forth.

In testimony whereof I have hereunto set my hand.

WILLIAM A. BOLE.

Witnesses:
ETHEL GALLAGHER,
F. E. GAITHER.